United States Patent [19]

Sano et al.

[11] 4,181,510
[45] Jan. 1, 1980

[54] WASTE GAS DISCHARGING DEVICE FOR USE IN INJECTION MOLDING MACHINE

[75] Inventors: Tsutomu Sano; Naoki Takeuchi; Masanobu Kurumaji; Susumu Nakatsukasa, all of Kobe, Japan

[73] Assignee: Kobe Steel, Limited, Kobe City, Japan

[21] Appl. No.: 950,050

[22] Filed: Oct. 10, 1978

[30] Foreign Application Priority Data

Oct. 7, 1978 [JP] Japan .................................. 53/121098

[51] Int. Cl.² .......................... B01D 19/00; B29F 3/03
[52] U.S. Cl. ........................................ 55/183; 55/189; 55/195; 264/102; 264/329; 425/203
[58] Field of Search ................... 55/55, 183, 189, 195, 55/310, 315; 264/102, 329; 425/203, 587

[56] References Cited

U.S. PATENT DOCUMENTS

| | | | |
|---|---|---|---|
| 2,378,539 | 6/1945 | Dawihl | 264/102 X |
| 2,964,513 | 12/1960 | Dale | 260/94.9 |
| 3,244,688 | 4/1966 | Goins | 159/25 |
| 3,253,303 | 5/1966 | Bradt | 425/203 X |
| 3,317,641 | 5/1967 | Heier | 264/102 |
| 3,917,502 | 11/1975 | Skidmore | 264/102 X |
| 3,937,778 | 2/1976 | Tanaka | 264/102 |
| 3,981,649 | 9/1976 | Shimano | 425/4 C |
| 3,992,500 | 11/1976 | Kruder et al. | 264/102 |
| 4,051,212 | 9/1977 | Grigat et al. | 264/102 |

FOREIGN PATENT DOCUMENTS 2159604   5/1973   France .................................. 425/203

*Primary Examiner*—Robert H. Spitzer
*Assistant Examiner*—Richard W. Burks
*Attorney, Agent, or Firm*—Oblon, Fisher, Spivak, McClelland & Maier

[57] ABSTRACT

A waste gas discharging device for use in an injection molding machine including a vacuum pump connected by way of a waste gas discharging unit to a vent hole in an injection molding machine, a branch path leading to a blower and connected between the vent hole and the waste gas discharging unit, the branch path being open and closed by a firstchange-over valve, and a second change-over valve disposed between the vacuum pump and the waste gas discharging unit, whereby waste gas from the waste gas discharging unit is discharged to atmosphere, without passing through the vacuum pump.

4 Claims, 1 Drawing Figure

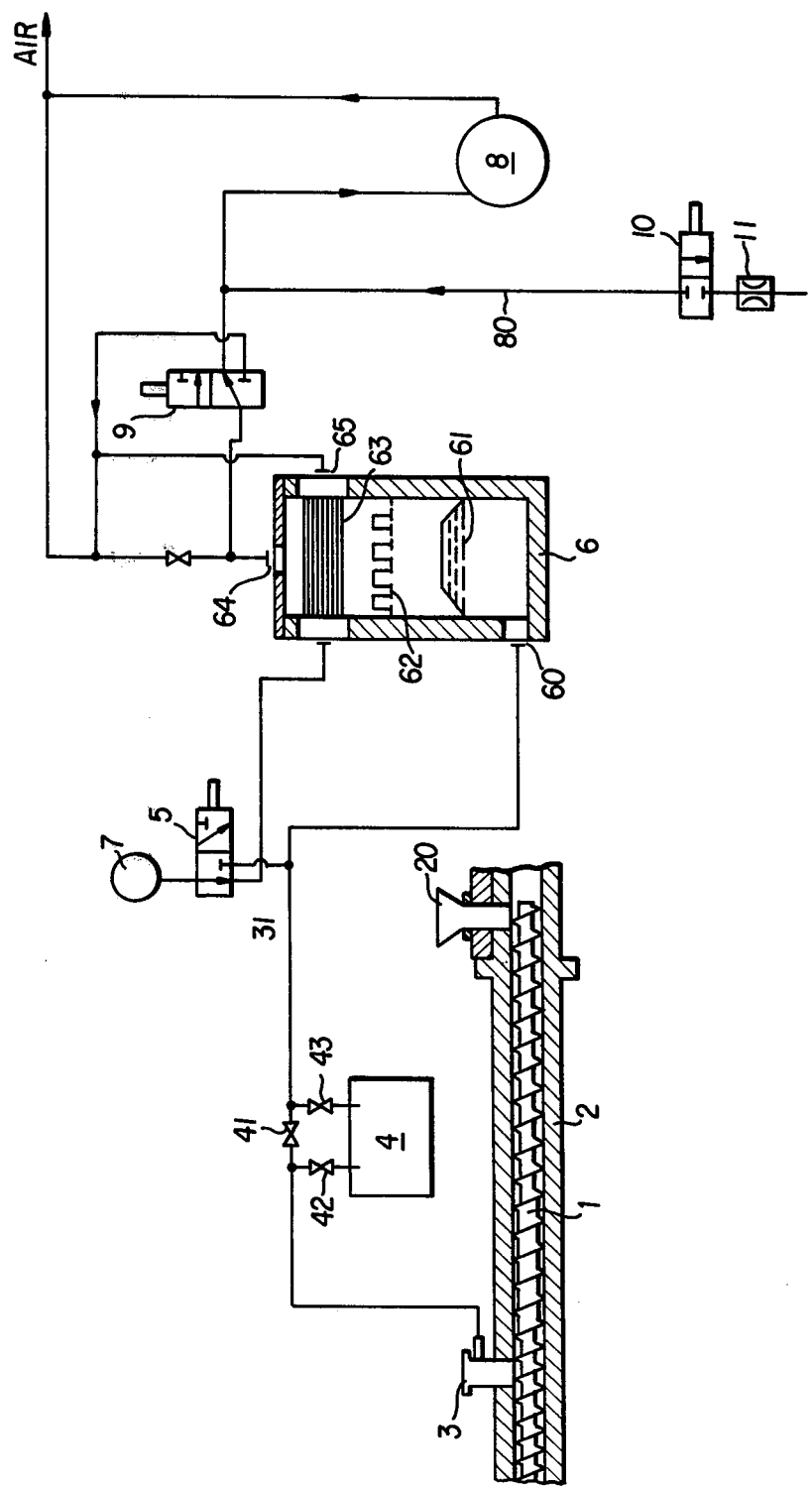

WASTE GAS DISCHARGING DEVICE FOR USE IN INJECTION MOLDING MACHINE

BACKGROUND OF THE INVENTION

1. Field of the Invention

This invention relates to a waste gas discharging device foruse in an injection molding machine, wherein the rising of a resin melt in a vent hole in an injection molding machine is prevented, and waste gas from the vent hole is effectively degased.

2. Description of the Prior Art

A prior art waste gas device for use in an injection molding machine has been so arranged that a waste gas discharging unit is directly attached to a vent hole in an injection molding machine, so as to discharge waste gas to atmosphere, or pressure in a vent hole in the injection molding machine is decreased by means of a vacuum pump, for the degasing from the waste gas. Such prior art waste gas discharging devices, however, have been attended with the following drawbacks.

The degasing type device incorporating a vacuum pump has been useful for degasing, but in the event that a molten resin is expanded upon interruption of a screw, even if a vacuum in a vent hole is decreased, the rising of such molten resin is not avoided. Although such is somewhat dependent on the type of resin or a gas content of resin. Furthermore, a component in the form of tar contained in the gas discharged from the vent hole tends to stick to a heater or a catalyst in a waste gas discharging device. Tar is directly heated and oxidized at the restarting of the device, resulting in decomposition of a component of a high concentration, with generation of unusual heat, which would cause explosion.

The waste gas discharging device requires a device for preventing explosion of gas. The explosion of gas is considered due to the following reasons:

(a) Due to the continuous and direct discharge of waste gas from a vent hole, a low concentration of oxygen in a gas to be discharged results in the failure of a complete combustion of the gas to be discharged.

(b) The incomplete combustion of the gas to be discharged results in discharge of an untreated gas.

(c) A tar component in an untreated gas tends to adhere to a heater and a catalyst, with the resultant increase in concentration of a material to be discharged at the restarting of the device, which would cause generation of unusual heat at the time of decomposition.

In the prior art device, since a waste gas heated to an elevated temperature (on the order of 350° C.) is directly discharged to atmosphere or sucked into a vacuum pump and an accident is likely to occur when such a waster gas at an elevated temperature is discharged to atmosphere or sucked into the vacuum pump.

SUMMARY OF THE INVENTION

It is accordingly an object of the present invention to provide a waste gas discharging device for use in an injection molding machine, wherein the rising of a resin melt in a vent hole is prevented, and waste gas is discharged with high efficiency, with the attendant freedom of any accident such as explosion of gas.

To attain the object, there is provided, according to the present invention, a waste gas discharging device, which comprises a vacuum pump connected by way of a waste gas discharging unit to a vent hole in an injection molding machine, a branch path leading to a blower and provided between the vent hole and the waste gas discharging unit, the branch path being opened or closed by a first change-over valve, and a second change-over valve provided between the vacuum pump and the waste gas discharging unit, whereby the gas from the waste gas discharging unit may be discharged directly to atmosphere, without passing through the vacuum pump, and pressure in the vent hole is increased during the interruption of a screw in the injection molding machine, thereby ensuring total prevention of the rising of a resin melt in the vent hole.

Another feature of the present invention is that a mist separator is disposed between the vent hole in the injection molding machine and the waste gas discharging unit, so as to prevent adhesion of mist to the waste gas discharging unit.

A further feature of the present invention is the provision for protection circuitry incorporated in the vacuum pump, so that when the second change-over valve is switched to the side for allowing discharge of waste gas directly to atmosphere, air is supplied to the vaccum pump, so as to lessen variation of load in the vacuum pump, for the protection thereof.

BRIEF DESCRIPTION OF THE DRAWING

Other objects, features and attendant advantages of the present invention will be more fully appreciated as the same becomes better understood from the following detailed description when considered in connection with the accompanying drawing, wherein the sole FIGURE is a cross sectional view of the elements according to the present invention.

DESCRIPTION OF THE PREFERRED EMBODIMENT

Referring to the accompanying drawing, shown at 1 is a screw in an injection molding machine, and at 2 a cylinder, in the mid-portion of which is provided a vent hole 3, from which moisture and a volatile matter are to be removed from a molten resin transported thereto through cylinder 2 by screw 1.

A vacuum pump 8 is connected by way of a piping to vent hole 3 so that waste gas from vent hole 3 is discharged by way of vacuum pump 8 or directly (without passing through the vacuum pump) to atmosphere. A waste gas discharging unit 6 is disposed between vent hole 3 and vacuum pump 8, and a mist separator 4 is disposed between waste gas discharging unit 6 and vent hole 3.

Shown at 41 is a by-pass valve, and at 42 and 43 inlet and outlet valves, respectively, for mist separator 4. Provided between mist separator 4 and waste gas discharging unit 4 is a branch path 31 to which is connected a blower 7 by way of a first solenoid operated-directional valve 5.

Waste gas discharging unit 6 incorporates therin a heater 61, a layer of catalyst 62 such as a plutinum catalyst, and a waste gas cooling unit 63 in the order described from below of the unit. The unit has an upper outlet 64 to which is connected vacuum pump 8 by way of a second directional valve 9, so that waste gas may be discharged therethrough to atmosphere. Vacuum pump 8 includes a protection circuit 80 to which is connected a flow control valve 11 by way of a directional valve 10.

In operation, a resin supplied from a hopper 20 of the injection molding machine is transported to the front of the machine by the rotating screw 1 while being molten and kneaded. The screw is adapted to rotate, stop and advance. If vent hole 3 is usually maintained in a pressure-decreased condition, the rising of a resin melt occurs. To avoid this, vent hole 3 is maintained in a pressure-decreased state only for the duration of the running of the screw. Blower 7 and vacuum pump 9 are usually run, and directional valves 5, 9 and 10 are maintained in the condition as shown in the drawing during rotation of the screw. Thus, vent hole 3 is pressure-decreased by vacuum pump 8.

Waste gas from a molten resin passes through mist separator 4, for removal of mist therefrom, and then introduced into waste gas discharging unit 6. During the passing of waste gas through this unit, tar is removed by catalyst layer 62, the waste gas is cooled by cooling unit 63 and then discharged through outlet 64, directional valve 9 and through vacuum pump 8 to atmosphere. For this duration, air from blower 7 is continuously discharged through directional valve 5, cooling unit 63 and outlet 65 to atmosphere.

When screw 1 is stopped, directional valves 5, 9 and 10 are respectively changed over to the other side, so that branch path 31 is connected to blower 7, outlet 64 in the waste gas discharging unit is connected to the side for allowing discharge of waste gas to atmosphere, connection of vacuum pump 8 to waste gas discharging unit 6 is interrupted, and in turn the vacuum pump is connected to flow rate adjusting valve 11. Consequently, air is supplied from blower 7 to vent hole 3, thereby increasing pressure in vent hole 3 to thus prevent the rising of a resin melt in the vent hole.

Air from blower 7 is also fed through inlet 60 into waste gas discharging unit 6, so as to facilitate combustion of tar or the like stuck to heater 61 and catalyst layer 62 in the waste gas discharging process. The gas is then discharged through outlet 64 by way of electromagnetic change-over valve 9 to atmosphere. On the other hand, connection of the continuously running vacuum pump to waste gas discharging unit 6 is interrupted by means of electromagnetic change-over valve 9, and the vacuum pump is in turn connected to flow rate adjusting valve 11 by electromagnetic change-over valve 10, so that pressure of an optimum value (for example, 100 to 150 Torr) is provided on the suction side of the vacuum pump.

The reason for incorporating the protection circuit in the vacuum pump is to prevent creation of vacuum on the suction side of the vacuum pump due to interruption of communication of the pump with electromagnetic change-over valve 9 because such vacuum would lead to defective lubrication as well as defective cooling, and further to a large variation of load upon recommencement of suction at a succeeding cycle by the change over of directional valve 9, resulting in a shortened service life of the vacuum pump.

For the duration within which screw 1 is not rotated and continues an advancing motion, pressure in vent hole 3 is increased to thereby prevent the rising of a resin melt and waste gas is burned in waste gas discharging unit 6, and when screw 1 starts rotating, electromagnetic change-over valves 5, 9 and 10 are respectively brought to the positions as shown in the drawing. Thus, vent hole 3 is again pressure-decreased by vacuum pump 8, permitting the degasing of waste gas from a molten resin with high efficiency.

The resultant waste gas is discharged through waste gas discharging unit 6 in a like manner as described above. In this respect, tar stuck to the waste gas discharging unit has been oxidated and removed by this time by air from blower 7 during the interruption of the screw. This ensures removal of tar or the like from waste gas with high efficiency, thus eliminating decomposition of a component of a high concentration, such as tar, which would cause an accident such as generation of unusual heat or explosion of gas. The cooling of waste gas in cooling unit 13 protects vacuum pump 8 from being heated, as well as preventing a secondary accident due to heated gas being discharged at atmosphere.

According to the present invention, waste gas from the vent hole is efficiently discharged by the vacuum pump to atmosphere, and the waste gas is passed through the waste gas discharging unit for removal of tar or the like, while the vent hole is pressurized during the stop of the screw, so as to prevent the rising of a resin melt in the vent hole. During the stopping of the screw, the vent hole is pressurized, and at the same time, air is supplied to the waste gas discharging unit so as to clean the same.

The waste gas from the vent hole is caused to pass through the mist separator, so that the waste gas free of mist is streamed into the waste gas discharging unit, thereby preventing explosion of gas due to mist. Furthermore, by the provision of the protection circuit in the vacuum device, an abrupt variation in pressure on the suction side thereof is prevented, with an extended service life of the vacuum device, despite the continuous running thereof.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States of America is:

1. A waste gas discharging device including a blower for use in an injection molding machine which comprises:
    a vacuum pump connected by way of a waste gas discharging unit to a vent hole in said injection molding machine;
    a first directional change-over valve;
    a branch path leading to said blower and connected between said vent hole and said waste gas discharging unit, said branch path being open and closed by said first change-over valve; and
    a second directional change-over valve disposed between said vacuum pump and said waste gas discharging unit, whereby waste gas from said waste gas discharging unit is discharged to atmosphere without passing through said vacuum pump.

2. A waste gas discharging device as defined in claim 1, which further comprises a mist separator between the vent hole and the waste gas discharging unit.

3. A waste gas discharging device as defined in claim 2, which further comprises a protection circuit provided in the vacuum pump so that air is supplied to the vacuum pump when said second directional change-over valve is turned to the side for allowing discharge of gas to atmosphere.

4. A waste gas discharging device as defined in claim 1 wherein said waste gas discharging unit includes a heater, a layer of catalyst positioned above said heater, and cooling means disposed above said layer of catalyst with a gas to be discharged being introduced into the unit from the bottom thereof and discharged from the top portion thereof and wherein air is introduced from said blower into said cooling means when said first directional change-over valve in said branch path is closed.

* * * * *

UNITED STATES PATENT AND TRADEMARK OFFICE
CERTIFICATE OF CORRECTION

PATENT NO. : 4,181,510

DATED : January 1, 1980

INVENTOR(S) : TSUTOMR SANO ET AL

It is certified that error appears in the above-identified patent and that said Letters Patent are hereby corrected as shown below:

[30]　Foreign Application Priority Data
　　　Oct. 7, 1977　[FP]　Japan.............52/121098

Signed and Sealed this

Twenty-fifth Day of March 1980

[SEAL]

Attest:

SIDNEY A. DIAMOND

Attesting Officer

Commissioner of Patents and Trademarks